United States Patent [19]

Snyder et al.

[11] 4,180,228
[45] Dec. 25, 1979

[54] PIPE CLAMP

[75] Inventors: Richard C. Snyder, Michigan City, Ind.; Donald C. Bodinger, Pelham, Ala.

[73] Assignee: Pullman Incorporated, Chicago, Ill.

[21] Appl. No.: 891,418

[22] Filed: Mar. 29, 1978

[51] Int. Cl.² .............................................. F16L 3/04
[52] U.S. Cl. ........................................ 248/74 R; 85/7; 105/1 A; 105/414; 188/33
[58] Field of Search .............. 248/74 R, 72, 55; 285/63; 188/206 R, 33; 105/1 A, 413, 396, 397, 414; 24/275, 276, 277; 403/398, 399; 85/1 T, 7

[56] References Cited

U.S. PATENT DOCUMENTS

| 1,802,353 | 4/1931 | Rousek et al. | 285/63 X |
| 2,567,463 | 9/1951 | Atkinson | 248/72 X |
| 2,698,760 | 1/1955 | Roth et al. | 285/63 |
| 2,985,934 | 5/1961 | Daubner | 24/277 |
| 3,042,223 | 7/1962 | Austgen | 285/63 X |
| 3,095,776 | 7/1963 | Brilmyer et al. | 85/7 |
| 3,178,208 | 4/1965 | Koehler | 24/277 X |
| 3,199,815 | 8/1965 | Martinkovic et al. | 248/59 |
| 3,344,935 | 10/1967 | Stewart et al. | 285/63 X |
| 3,570,794 | 3/1971 | Kirchner | 248/74 R |
| 3,711,050 | 1/1973 | Case | 248/74 R |
| 3,735,950 | 5/1973 | Paintin | 248/62 |
| 3,792,933 | 2/1974 | Stencel | 85/7 X |
| 4,006,874 | 2/1977 | McGee | 248/74 R |

OTHER PUBLICATIONS

"Freight Car Brake Equipment", Wabco Westinghouse Air Brake Division, p. 16 of Spec. No. 2518, Jan. 1975.
"Huck Industrial Fasteners", copyright 1972, Huck Manufacturing Company.

Primary Examiner—Rodney H. Bonck
Attorney, Agent, or Firm—Richard J. Myers

[57] ABSTRACT

A vibration accommodating clamp for securing pipes which carry brake lines and the like to the underframes of railway cars. The clamp is initially mounted by placing a U-shaped bolt over the pipe and through holes in a mounting bracket and permanently securing a collar on a grooved portion of one leg of the bolt. The second leg of the bolt remains unused until it is necessary to remove the clamp. The clamp is removed by cutting off the collar and reapplied by placing a nut and washer on the threaded portion of the unused leg.

4 Claims, 6 Drawing Figures

PIPE CLAMP

BACKGROUND OF THE INVENTION

1. Field of the Invention

The invention relates to railway cars having pipes which carry brake lines and the like and more particularly to a clamp for securing the pipes to the underframe of railway cars.

2. Description of the Prior Art

The prior art includes U.S. Pat. No. 3,711,050 issued Jan. 16, 1973; U.S. Pat. No. 3,199,815 issued Aug. 10, 1965; U.S. Pat. No. 3,570,794 issued Mar. 16, 1971; and U.S. Pat. No. 3,735,950 issued May 29, 1973. The prior art also includes various fasteners which are adapted to clamp parts together at a predetermined force.

The above patents show a pipe clamp which secures a pipe to suitable bracket means. Each clamp utilizes a conventional U-bolt with nuts connected to both legs of the bolt. The present invention is an improvement over the art.

SUMMARY OF THE INVENTION

Many types of railway cars have pipes for carrying brake lines and the like which are secured to the underframe of the car by the use of clamps. While the cars are in service it sometimes becomes necessary to remove one or more of the clamps to make a repair. This problem is especially difficult in the field where replacement parts and special tools are often unavailable.

The clamp comprises a generally U-shaped bolt having a pair of spaced first and second legs which extend through openings in a mounting bracket. The surface of the bend portion which abuts the pipe is flat thereby increasing the surface area in contact with the pipe and decreasing the stress imposed on the pipe when it is in the clamped position.

When initially installed the bolt is placed over the pipe through holes in a mounting bracket and a collar is permanently attached to a grooved portion on the first leg with a special mounting tool. The second leg remains unused. The first leg has a grooved portion, a recessed portion and a threaded portion and is adapted to break off at the recessed portion at a predetermined pulling force on the threaded portion. Thus overtightening of the bolt and crimping of the pipe is prevented. When it is necessary to remove the clamp the first leg and collar are cut off and the bolt is reapplied by placing a nut on the threaded second leg.

The holes in the bracket through which the legs of the bolt are placed are slightly larger than the thickness of the legs. When the bolt is in the installed position limited lateral movement of the unused leg is possible. Thus during operation of the car slight flexure of the bolt accommodates vibration and attenuates stresses on the pipe being secured.

BRIEF DESCRIPTION OF THE DRAWINGS

FIG. 6 shows the U-bolt after the collar has been cut off and the nut secured on the second leg.

DESCRIPTION OF THE PREFERRED EMBODIMENT

Figure 1:
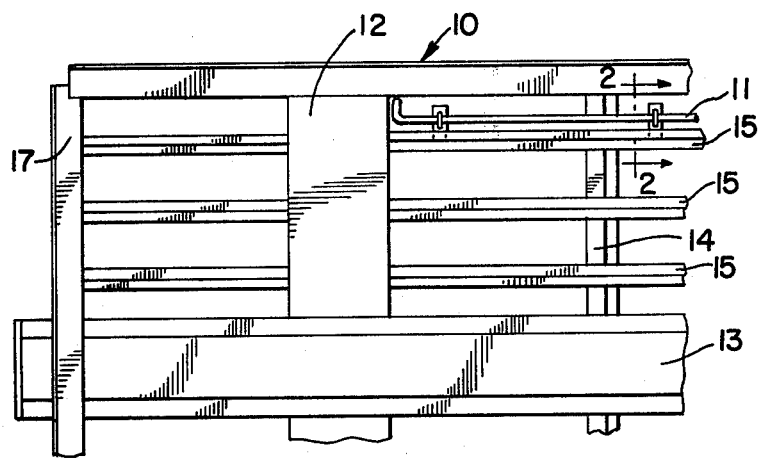
FIG. 1 is a top view of a portion of the underframe of a railway car showing the clamp in its installed position.

FIG. 1 discloses a top view of a portion of a railway car having a conventional underframe 10 on which various types of pipes 11 must be supported. The underframe 10 includes a pair of transversely extending carbody bolsters 12, only one of which is shown, and a longitudinally extending center sill 13. Cross ties 14 extend between the side sills 15 and carry stringers or support members 16 which extend the length of the car, terminating at the car end 17.

Figure 2:
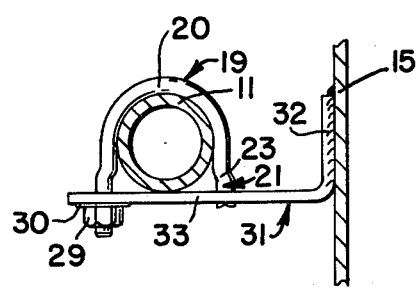
FIG. 2 is an enlarged perspective view showing the pipe clamp in its installed position.

FIG. 2 is a perspective of the pipe clamp 18 in its installed position. The clamp 18 comprises a U-shaped bolt 19 having an arcuate bend or bight portion 20 with spaced substantially parallel first and second legs, 21 and 22 respectively. The legs 21 and 22 are connected to the bend portion 20 by outwardly flared portions 23. The inside surface 24 of the bend portion 20 is flat thereby increasing the surface area in contact with the pipe and decreasing the stress imposed on the pipe when the clamp is tightly secured.

The first leg 21 has a grooved portion 25 connected to the outwardly flared portion 23. The grooved portion 25 in turn is connected to a recessed portion 26 which is connected to a threaded end portion 27. The threaded end portion 27 is severable at the recessed portion 26 at a predetermined tensile force on the end portion. The second leg 22 of the U-bolt has threads 28 for use with a conventional nut and washer, 29 and 30 respectively.

An L-shaped mounting bracket 31 has a first leg 32 which is secured to the support member 15 and a second leg 33 which has holes 34 adapted to receive the legs of the U-shaped bolt 19. The U-shaped bolt is placed over the pipe 19 and through the holes 34 in the second leg 33 of the mounting bracket. A washer 35 and collar 36 are connected to the grooved portion 25 of the first leg 21 permanently securing the pipe 11 in place. The threaded portion 28 of the second leg 22 remains unused, but ready for later use if the need arises. If it becomes necessary to remove the clamp 18 the collar 36 and first leg 21 are cut off and a nut 29 and washer 30 are placed on the threaded portion 28 of the second leg. As shown in FIG. 6, limited lateral movement of the first leg 21 is allowed when a nut and washer have been applied to the second leg.

Figure 4:
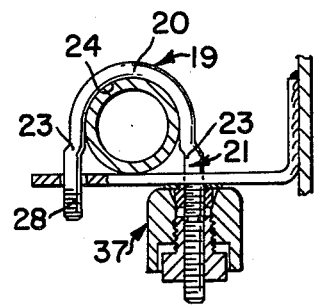
FIG. 4 is a cross-sectional view through the installation tool.

As shown in FIGS. 2 and 4, the openings 34 through which the legs extend are slightly larger than the thickness of the legs. Thus in the installed position the unused second leg 22, is allowed limited lateral movement in the opening 34. During operation of the vehicle, slight flexure of the bolt 19 accommodates vibration and tends to attenuate stresses on the pipe 11 being secured. Of course, when the second leg 22 is being used to secure the pipe 11, the first leg 21, which has been partially removed, will be allowed limited lateral movement in the same fashion as described above.

Figure 3:
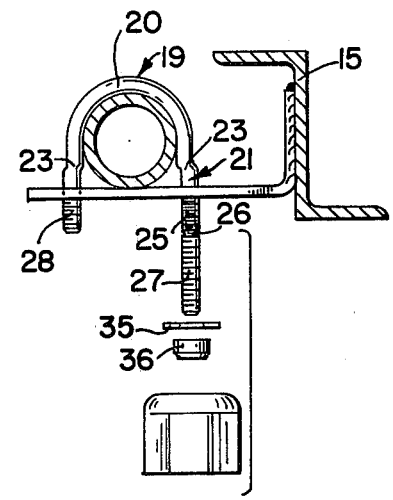
FIG. 3 shows the clamp with the washer and collar ready for installation.
Figure 5:
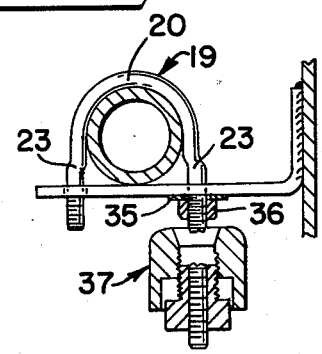
FIG. 5 is a cross-sectional view through the installation tool after the collar has been swaged onto the grooved portion of the first leg of the U-bolt.

FIGS. 3, 4 and 5 show a typical installation cycle. The washer 35 and collar 36 are placed over the grooved portion 25 of the first leg 21. A mounting tool 37 is used to swage or press the collar 36 onto the grooved portion 25 by applying a pulling or tensile force on the threaded severable end portion 27. The severable end portion 27 is adapted to break off at the recessed portion 26 at a predetermined tensile force. Thus the bolt cannot be overtightened and crimping of the pipe 11 is avoided.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a railway car having an underframe and members such as pipes for carrying brake lines and the like, a clamp comprising:
    a generally U-shaped bolt including a bend portion and substantially parallel first and second legs;
    bracket means mounted on the underframe;
    said bracket means having holes through which the legs of the U-bolt extend thereby entrapping the pipe between the bend portion and the bracket;
    said first leg having a grooved portion, a recessed portion and a threaded severable end portion;
    said severable end portion being severable at the recessed portion at predetermined force on the leg;
    a collar for permanently fastening the U-bolt at the grooved portion of the first leg;
    said second leg being initially unsecured, and adapted to receive a threaded fastener so that the collar on the first leg can be cut off and the U-bolt secured by means of said threaded fastener;
    said bend portion having a substantially semi-circular flat surface in contact with the pipe thereby minimizing stress on the pipe and insuring a snug fit;
    said first and second legs each being connected to the bend portion by an outwardly flared portion;
    said first and second legs being spaced from and offset with respect to the outside diameter of the pipe, thereby facilitating installation and preventing damage to the threaded and grooved portions of the legs during installation of the bolt; and
    the hole through which the second leg extends includes an inner peripheral surface radially spaced a predetermined distance from said second leg sufficient to permit axial positioning of the second leg therethrough and accommodating limited stress attenuating deflection of said second leg when unsecured, and said second leg being reactively engageable against said inner peripheral surface to abate excessive movement of said second leg attendant to predetermined dynamic loading on the pipe during high speed rail operations thereby preventing substantial deflection of said second leg from a generally perpendicular disposition relative to the plane of said bracket hole.

2. The invention according to claim 1, wherein
    said second leg includes a nut adapted to fit the threaded portion of the second leg for securing the second leg to the bracket upon the collar being removed from the first leg;
    said first leg having a section remaining after removal of the collar;
    said remaining section being unsecured in the installed position extending through one of said holes; and
    the hole through which the remaining section extends includes an inner peripheral surface radially spaced a predetermined distance from said remaining section accommodating limited stress attenuating deflection of said remaining section, and said remaining section being reactively engageable against said inner peripheral surface to abate excessive movement of said remaining section attendant to high speed rail operations thereby preventing substantial deflection of said remaining section from a generally perpendicular disposition relative to the plane of said bracket hold.

3. In a support structure adapted to secure a pipe to a railway car body, the improvement comprising:
    a substantially U-shaped bolt having a semi-circular bend portion in abutment with and embracing the pipe and a pair of legs;
    said legs being spaced from and offset with respect to the outside diameter of the pipe;
    bracket means having a pair of openings attached to said car body and said openings being adapted to receive said legs;
    means securing one of the legs to the bracket with the other of said legs being unsecured; and
    the opening through which said unsecured leg extends having an inner peripheral surface radially spaced a predetermined distance from said unsecured leg accommodating limited stress attenuating deflection of said unsecured leg, and said unsecured leg being reactively engageable against said inner peripheral surface to abate excessive movement of said unsecured leg attendant to predetermined dynamic loading on the pipe during high speed rail operations thereby preventing substantial deflection of said unsecured leg from a generally perpendicular disposition relative to the plane of said bracket hole.

4. The invention according to claim 9, wherein
    said unsecured leg includes means for securing the same to said bracket upon said one leg being cut off such that said means securing said one leg are removed whereby the remaining portion of said one leg extends through said bracket opening.

* * * * *

UNITED STATES PATENT AND TRADEMARK OFFICE
CERTIFICATE OF CORRECTION

PATENT NO. : 4,180,228
DATED : December 25, 1979
INVENTOR(S) : Richard C. Snyder, Donald C. Bodinger It is certified that error appears in the above-identified patent and that said Letters Patent are hereby corrected as shown below:

column 4, line 50, change "9" to --3--

Signed and Sealed this

Fifth Day of August 1980

[SEAL]

Attest:

SIDNEY A. DIAMOND

Attesting Officer

Commissioner of Patents and Trademarks